United States Patent
Leigh et al.

(10) Patent No.: US 6,322,745 B1
(45) Date of Patent: Nov. 27, 2001

(54) DIRECT SMELTING VESSEL AND DIRECT SMELTING PROCESS

(75) Inventors: David John Leigh, Kensington; Peter Damian Burke, Winthrop; Cecil Peter Bates, Mt. Pleasant, all of (AU); Ralph Gottfried Weber, deceased, late of Rio de Janerio (BR), by Margot Weber, legal representative

(73) Assignee: Technological Resources Pty. Ltd., Melbourne (AU)

( * ) Notice: Subject to any disclaimer, the term of this patent is extended or adjusted under 35 U.S.C. 154(b) by 0 days.

(21) Appl. No.: 09/535,665

(22) Filed: Mar. 21, 2000

Related U.S. Application Data

(63) Continuation of application No. PCT/AU99/00537, filed on Jul. 1, 1999.

(30) Foreign Application Priority Data

Jul. 1, 1998 (AU) .................................................. PP 4425

(51) Int. Cl.⁷ ...................................................... C21C 1/00
(52) U.S. Cl. ............................ 266/44; 266/236; 266/241
(58) Field of Search .................................. 266/241, 158, 266/182, 200, 236, 44, 45

(56) References Cited

U.S. PATENT DOCUMENTS

| Re. 33,464 | 11/1990 | Gitman . |
|---|---|---|
| 2,647,045 | 7/1953 | Rummel . |

(List continued on next page.)

FOREIGN PATENT DOCUMENTS

| A-23864/84 | 1/1984 | (AU) . |
|---|---|---|
| B-41064/85 | 4/1986 | (AU) . |
| B-69707/87 | 9/1987 | (AU) . |
| B-22448/88 | 5/1989 | (AU) . |
| B-26831/88 | 6/1989 | (AU) . |

OTHER PUBLICATIONS

Patent abstracts of Japan, C–497, p. 115, JP,A, 62–280315 (Nippon Kokan K.K), Dec. 15, 1987.
Derwent Abstract Accession No. 87–039748/06 Class Q77, JP, A, 61–295334, Dec. 26, 1986.
Patent Abstract of Japan, JP, A, 10–280020 (Nippon Steel Corp.), Oct. 20, 1998.
Patent Abstracts of Japan, C–951, p. 24, JP, A, 04–63218 (Kawasaki Heavy Ind. Ltd), Feb. 28. 1992
Patent Abstracts of Japan, C–627, p. 109, Jp, A, 01–127613 (Kawasaki Steel Corp.), May 19, 1989.
WPAT print–out for Brazilian patent application P19400123–5 (Weber).
Patent Abstracts of Japan, C–951, JP, A, 4–63217 (Kawasaki Heavy Ind. Ltd.), Feb. 28, 1992.

*Primary Examiner*—Scott Kastler
(74) *Attorney, Agent, or Firm*—Merchant & Gould P.C.

(57) ABSTRACT

A vessel which produces metal from a metalliferous feed material by a direct smelting process is disclosed. The vessel contains a molten bath having a metal layer (15) and a slag layer (16) on the metal layer and has a gas continuous space (31) above the slag layer. The vessel includes a hearth formed of refractory material having a base (3) and sides (55) in contact with the molten metal and side walls (5) which extend upwardly from the sides (55) of the hearth and are in contact with the slag layer and the gas continuous space. The side walls that contact the gas continuous space include water cooled panels (57) and a layer of slag on the panels. The vessel also includes one or more than one lance/tuyere (13) extending downwardly into the vessel and injecting an oxygen-containing gas into the vessel above the metal layer and a plurality of lances/tuyeres (11) injecting at least part of the metalliferous feed material and a carbonaceous material with a carrier gas into the molten bath so as to penetrate the metal layer.

24 Claims, 2 Drawing Sheets

U.S. PATENT DOCUMENTS

| | | |
|---|---|---|
| 3,844,770 | 10/1974 | Nixon . |
| 3,845,190 | 10/1974 | Yosim et al. . |
| 3,888,194 | 6/1975 | Kishigami et al. . |
| 3,890,908 | 6/1975 | von Klenck et al. . |
| 3,894,497 | 7/1975 | Helke et al. . |
| 4,007,034 | 2/1977 | Hartwig et al. . |
| 4,053,301 | 10/1977 | Stephens, Jr. . |
| 4,145,396 | 3/1979 | Grantham . |
| 4,177,063 | 12/1979 | Dickson . |
| 4,207,060 | 6/1980 | Zangs . |
| 4,356,035 | 10/1982 | Brotzmann et al. . |
| 4,389,043 | 6/1983 | Weber et al. . |
| 4,400,936 | 8/1983 | Evans . |
| 4,402,274 | 9/1983 | Meenan et al. . |
| 4,431,612 | 2/1984 | Bell et al. . |
| 4,447,262 | 5/1984 | Gay et al. . |
| 4,455,017 | 6/1984 | Wunsche . |
| 4,468,298 | 8/1984 | Byrne et al. . |
| 4,468,299 | 8/1984 | Byrne et al. . |
| 4,468,300 | 8/1984 | Byrne et al. . |
| 4,481,891 | 11/1984 | Takeshita et al. . |
| 4,504,043 | 3/1985 | Yamaoka et al. . |
| 4,511,396 | 4/1985 | Nixon . |
| 4,565,574 | 1/1986 | Katayama et al. . |
| 4,566,904 | 1/1986 | von Bogdandy et al. . |
| 4,572,482 | 2/1986 | Bedell . |
| 4,574,714 | 3/1986 | Bach et al. . |
| 4,602,574 | 7/1986 | Bach et al. . |
| 4,664,618 | 5/1987 | Gitman . |
| 4,681,599 | 7/1987 | Obkircher . |
| 4,684,448 | 8/1987 | Itoh et al. . |
| 4,701,214 | 10/1987 | Kaneko et al. . |
| 4,718,643 | 1/1988 | Gitman . |
| 4,786,321 | 11/1988 | Hoster et al. . |
| 4,790,516 | 12/1988 | Sugiura et al. . |
| 4,798,624 | 1/1989 | Brotzmann et al. . |
| 4,849,015 | 7/1989 | Fassbinder et al. . |
| 4,861,368 | 8/1989 | Brotzmann et al. . |
| 4,874,427 | 10/1989 | Hamada et al. . |
| 4,890,562 | 1/1990 | Gitman . |
| 4,913,734 | 4/1990 | Romenets et al. . |
| 4,923,391 | 5/1990 | Gitman . |
| 4,940,488 | 7/1990 | Maeda et al. . |
| 4,946,498 | 8/1990 | Weber . |
| 4,976,776 | 12/1990 | Elvander et al. . |
| 4,999,097 | 3/1991 | Sadoway . |
| 5,005,493 | 4/1991 | Gitman . |
| 5,024,737 | 6/1991 | Claus et al. . |
| 5,037,608 | 8/1991 | Tarcy et al. . |
| 5,042,964 | 8/1991 | Gitman . |
| 5,050,848 | 9/1991 | Hardie et al. . |
| 5,051,127 | 9/1991 | Hardie et al. . |
| 5,065,985 | 11/1991 | Takahashi et al. . |
| 5,177,304 | 1/1993 | Nagel . |
| 5,191,154 | 3/1993 | Nagel . |
| 5,222,448 | 6/1993 | Morgenthaler et al. . |
| 5,238,646 | 8/1993 | Tarcy et al. . |
| 5,271,341 | 12/1993 | Wagner . |
| 5,279,715 | 1/1994 | La Camera et al. . |
| 5,301,620 | 4/1994 | Nagel et al. . |
| 5,302,184 | 4/1994 | Batterham et al. . |
| 5,322,547 | 6/1994 | Nagel et al. . |
| 5,332,199 | 7/1994 | Knapp et al. . |
| 5,333,558 | 8/1994 | Lees, Jr. . |
| 5,396,850 | 3/1995 | Conochie et al. . |
| 5,401,295 | 3/1995 | Brotzmann . |
| 5,407,461 | 4/1995 | Hardie et al. . |
| 5,415,742 | 5/1995 | La Camera et al. . |
| 5,443,572 | 8/1995 | Wilkison et al. . |
| 5,480,473 | 1/1996 | Hardie et al. . |
| 5,489,325 | 2/1996 | Keogh et al. . |
| 5,498,277 | 3/1996 | Floyd et al. . |
| 5,518,523 | 5/1996 | Brotzmann . |
| 5,529,599 | 6/1996 | Calderon . |
| 5,613,997 | 3/1997 | Satchell, Jr. . |
| 5,640,708 | 6/1997 | Conochie et al. . |
| 5,647,888 | 7/1997 | Keogh et al. . |
| 5,662,860 * | 9/1997 | Klassen et al. ...................... 266/182 |
| 5,741,349 | 4/1998 | Hubble et al. . |
| 5,800,592 | 9/1998 | den Hartog et al. . |
| 5,802,097 | 9/1998 | Gensini et al. . |
| 5,938,815 | 8/1999 | Satchell, Jr. . |

FOREIGN PATENT DOCUMENTS

| | | |
|---|---|---|
| B1 4,940,488 | 8/1999 | Maeda et al. . |
| B-28802/89 | 8/1989 | (AU) . |
| A-42859/89 | 4/1990 | (AU) . |
| A-49307/90 | 9/1990 | (AU) . |
| A-49309.90 | 9/1990 | (AU) . |
| B-74840/91 | 10/1991 | (AU) . |
| B-90957/91 | 8/1992 | (AU) . |
| A-48938/93 | 4/1994 | (AU) . |
| B-48937/93 | 5/1994 | (AU) . |
| B-50820/96 | 1/1997 | (AU) . |
| 3139375 | 4/1983 | (DE) . |
| 3244744 | 5/1984 | (DE) . |
| 079 182 A1 | 5/1983 | (EP) . |
| 084 288 A1 | 7/1983 | (EP) . |
| 422 309 A1 | 4/1991 | (EP) . |
| 541 269 A1 | 5/1993 | (EP) . |
| 592 830 A1 | 4/1994 | (EP) . |
| 657 550 | 6/1995 | (EP) . |
| 2 043 696 A | 10/1980 | (GB) . |
| 2 088 892 A | 6/1982 | (GB) . |
| WO 89/01981 | 3/1989 | (WO) . |
| WO 92/12265 | 7/1992 | (WO) . |
| WO 93/06251 | 4/1993 | (WO) . |
| WO 94/19497 | 9/1994 | (WO) . |
| WO 96/19591 | 6/1996 | (WO) . |
| WO 96/31627 | 10/1996 | (WO) . |
| WO 97/17473 | 5/1997 | (WO) . |
| WO 97/20958 | 6/1997 | (WO) . |
| WO 97/23656 | 7/1997 | (WO) . |
| WO 98/27232 | 6/1998 | (WO) . |
| WO 98/27239 | 6/1998 | (WO) . |
| WO 99/16911 | 4/1999 | (WO) . |

* cited by examiner

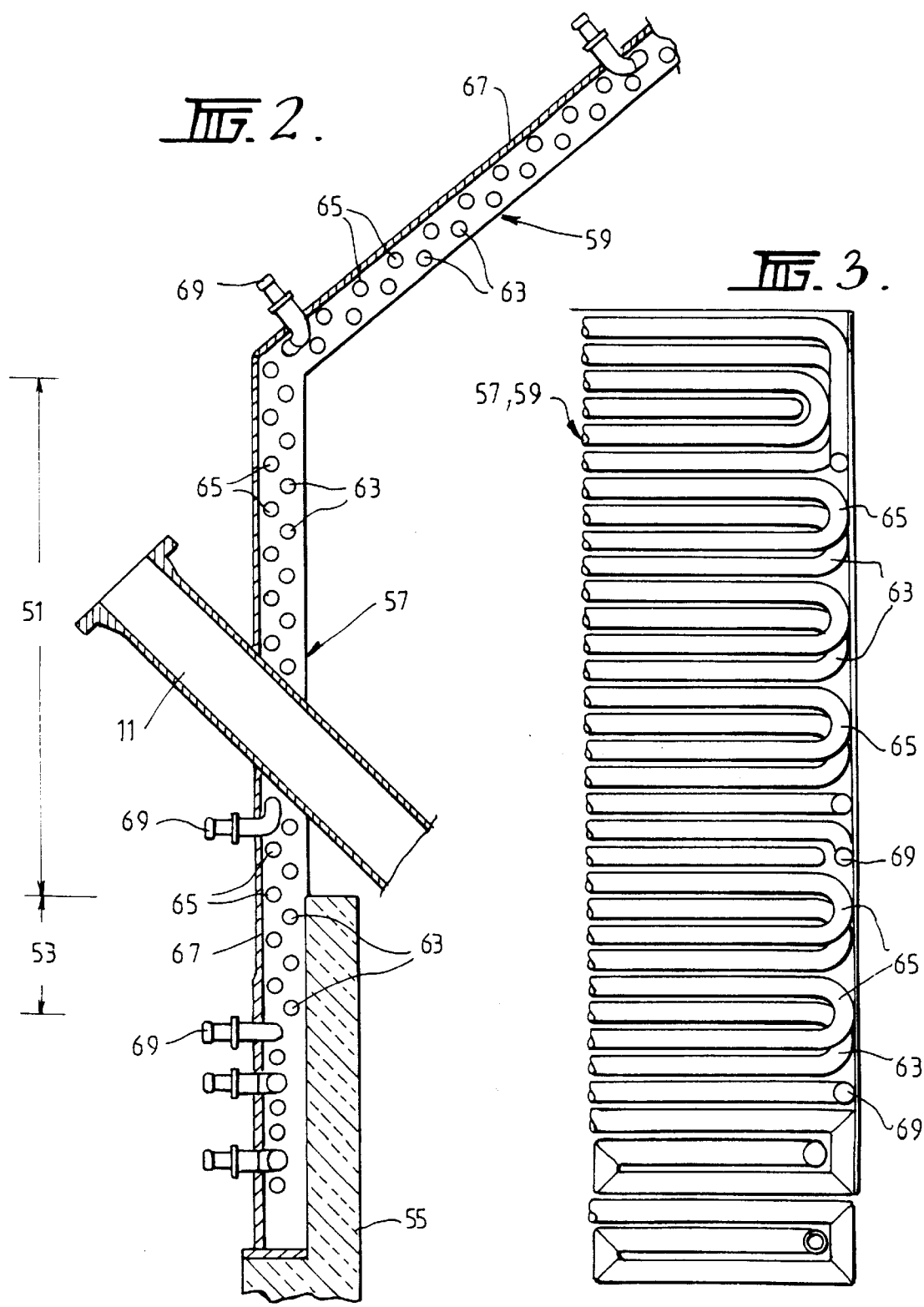

DIRECT SMELTING VESSEL AND DIRECT SMELTING PROCESS

This application is a continuation of international application number PCT/AU99/00537, filed Jul. 1, 1999, pending.

The present invention relates to a direct smelting vessel for producing molten metal (which term includes metal alloys) from a metalliferous feed material such as ores, partly reduced ores and metal-containing waste streams.

The present invention relates particularly to a vessel that can be used for molten bath-based direct smelting processes.

The present invention also relates to a direct smelting process that operates in the vessel.

The term "smelting" is understood herein to mean thermal processing wherein chemical reactions that reduce metalliferous feed material take place to produce liquid metal.

The term "direct smelting process" is understood herein to mean a process that produces a molten metal directly from a metalliferous feed material, such as iron ore and partly reduced iron ore.

There is a range of known vessels that has been developed to undertake molten bath-based direct smelting processes within a gas/liquid environment of a molten bath.

One known molten bath-based direct smelting process for producing molten iron from iron ore, which is generally referred to as the Romelt process, is based on the use of a large volume, highly agitated slag bath as the medium for smelting top-charged metal oxides to metal and for post-combusting gaseous reaction products and transferring the heat as required to continue smelting metal oxides. The Romelt process includes injection of oxygen enriched air or oxygen into the slag via a lower row of tuyeres to provide slag agitation and injection of oxygen into the slag via an upper row of tuyeres to promote post-combustion. In the Romelt process the metal layer is not an important reaction medium.

Another known group of molten bath-based direct smelting processes for producing molten iron from iron ore that is also slag-based is generally described as "deep slag" processes. These processes, such as DIOS and AISI processes, are based on forming a deep layer of slag with 3 regions, namely: an upper region for post-combusting reaction gases with injected oxygen; a lower region for smelting metal oxides to metal; and an intermediate region which separates the upper and lower regions. As with the Romelt process, the metal layer below the slag layer is not an important reaction medium.

Another known bath-based direct smelting process for producing molten iron from iron ore, which relies on a molten metal layer as a reaction medium, and is generally referred to as the HIsmelt process, is described in International application PCT/AU96/00197 (WO 96/31627) in the name of the applicant.

The HIsmelt process as described in the International application comprises:

(a) forming a bath of molten iron and slag in a vessel;
(b) injecting into the bath:
  (i) metalliferous feed material, typically metal oxides; and
  (ii) a solid carbonaceous material, typically coal, which acts as a reductant of the metal oxides and a source of energy; and
(c) smelting the metalliferous feed material to metal in the metal layer.

The HIsmelt process also comprises post-combusting reaction gases, such as CO and $H_2$, released from the bath in the space above the bath with injected oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

There are significant issues involved in constructing vessels that can contain the above-described direct smelting processes.

More particularly, for economic and safety reasons it is important that the vessels contain the direct smelting processes with minimal heat loss and be capable of withstanding the erosive/corrosive conditions that are a characteristic of the processes over long term operating campaigns.

Process containment must also be combined with means to inject and to mix reactants to form and maintain different zones in the vessels and to separate products of the processes.

Process chemistry of direct smelting processes generally requires a region of low oxygen potential to smelt metalliferous feed material and a region of high oxygen potential to combust hydrogen and carbon monoxide to obtain combustion energy. As a consequence, typically, there are wide variations in temperature and chemical composition throughout the vessels that contain direct smelting processes which place different demands on the design of vessels.

Some planned and tested direct smelting vessels include an outer steel shell and an internal lining of a refractory material, typically in the form of bricks and/or castables. It is known to use bricks of different composition and physical properties in different sections of the vessels to maximise resistance to thermal and chemical attack and erosion.

For example, refractory bricks in the base of the vessels are usually exposed to molten material that is predominantly metal whereas the refractory bricks in the mid-section of the side walls of the vessels are usually exposed to molten material that is predominantly slag and to gaseous reactants such as CO, $H_2$, $CO_2$ and $H_2O$. The bricks exposed to molten metal and the bricks exposed to molten slag require different chemical properties to resist chemical attack by metal and slag.

Moreover, in the case of vessels that operate slag-based direct smelting processes, such as the Romelt, DIOS, and AISI process, typically the slag region is agitated and the metal region is relatively undisturbed (compared with the HIsmelt process). As a consequence, the bricks exposed to the slag region require physical properties to resist erosion due to contact with agitated slag.

Furthermore, in the case of vessels that operate metal bath-based direct smelting processes, such as the HIsmelt process, typically the metal region is also agitated. As a consequence, the bricks exposed to this region require physical properties to resist erosion due to washing action of metal against the bricks.

Furthermore, in general terms, post-combustion of reaction gases generates high temperatures of the order of 2000° C. or higher and, as a consequence, the bricks exposed to the top space/transition zone/slag region in which post-combustion occurs require physical and chemical properties to withstand high temperatures.

In practice, linings of refractory materials have not been an unqualified success for a number of developing direct smelting processes.

There have been proposals to enhance the performance of refractory material linings by water cooling the linings. One particular proposal is described in Australian patent application 692405 in the name of Steel Technology Corporation in the context of a vessel for carrying out the AISI deep slag process. There have also been a limited number of proposals to use water cooled panels in place of refractory materials. On the basis of information available to the applicant these proposals have resulted in excessive heat losses and have been unsuccessful on this basis.

An object of the present invention is to provide an improved direct smelting vessel.

Another object of the present invention is to provide an improved direct smelting process that operates in the vessel.

The present invention achieves these objects by constructing a direct smelting vessel with water cooled panels in the side walls and the roof of the vessel and injection lances for oxygen-containing gas and injection lances for solids material extending into the vessel which make it possible to operate a direct smelting process in the vessel which builds-up and thereafter maintains on the water cooled panels a layer of slag which acts as an effective thermal insulation such that there are reduced heat losses from the vessel.

According to the present invention there is provided a vessel which produces metal from a metalliferous feed material by a direct smelting process, which vessel contains a molten bath having a metal layer and a slag layer on the metal layer and has a gas continuous space above the slag layer, which vessel includes:

(a) a hearth formed of refractory material having a base and sides in contact with the molten metal;

(b) side walls which extend upwardly from the sides of the hearth and are in contact with the slag layer and the gas continuous space, wherein the side walls that contact the gas continuous space include water cooled panels and a layer of slag on the panels;

(c) one or more than one lance/tuyere extending downwardly into the vessel and injecting an oxygen-containing gas into the vessel above the metal layer;

(d) a plurality of lances/tuyeres injecting at least part of the metalliferous feed material and a carbonaceous material with a carrier gas into the molten bath so as to penetrate the metal layer; and (e) a means for tapping molten metal and slag from the vessel.

Preferably the direct smelting process operates with heat losses of less than 150 kW/m$^2$ of exposed panel area of the water cooled panels under normal operating conditions.

The term "normal operating conditions" is understood herein to mean periods when the process is stable and excludes periods where there are likely to be high peak flux loads, such as during start-up.

Preferably, the direct smelting process operates with heat losses of less than 100 kW/m$^2$ of exposed panel area of the water cooled panels under normal operating conditions.

More preferably the direct smelting process operates with heat losses of less than 90 kW/m$^2$ of exposed panel area of the water cooled panels under normal operating conditions.

The water cooled panels may be of any suitable configuration.

One preferred construction of water cooled panel includes an inner (in relation to the inside of the vessel) water cooling pipe that has a serpentine shape, a water inlet at one end, and a water outlet at the other end.

Preferably the panel further includes an outer water cooling pipe that has a serpentine shape, a water inlet at one end, and a water outlet at the other end.

In one alternative construction the inner and outer water cooling pipes of a panel are interconnected and include a single inlet and a single outlet.

Preferably the panel further includes a refractory material rammed or gunned in the spaces of the panel that are not occupied by the pipes. It is believed that in practice this refractory material is worn away progressively during the life of the vessel, with the start-up phase and process perturbations of the direct smelting process causing the most significant wear. The erosion of the rammed or gunned refractory material can cause at least partial exposure of the inner water cooling pipe.

Preferably the rammed or gunned refractory material forms an inner surface of the panel.

The panel may include a support plate which forms an outwardly facing surface of the panel.

The water cooling pipes and the support plate may be constructed from any suitable materials. Suitable materials for the pipes include steel and copper. Steel is an example of a suitable material for the support plate.

Preferably each water cooling pipe includes parallel, horizontal sections that extend across the width of the panel and interconnect curved sections at the ends of the straight sections.

Preferably the outer water cooling pipe is displaced from the inner water cooling pipe so that the horizontal sections of the outer water cooling pipe are not immediately behind the horizontal sections of the inner water cooling pipe. As a consequence, at least a substantial part of an inner surface of the panel that is exposed to the inside of the vessel is subject to water cooling by water flowing through the inner and outer pipes.

Preferably the inner exposed surface of the panel includes a surface finish, such as a ripple or waffle surface, that increases the exposed surface area of the panel and promotes attachment of frozen slag onto the face.

Preferably the panel includes members, such as pins and cups, which project inwardly from the exposed face of the panel and promote formation and growth of frozen slag on the panel and assist the slag to key to the panel.

Preferably the side walls that contact the slag layer include water cooled panels, a lining of refractory and a layer of slag on the lining.

Preferably the refractory lining is formed from the refractory bricks.

Preferably the vessel contains a transition zone formed by ascending and thereafter descending splashes, droplets and streams of molten material in the gas continuous space above the slag layer with some of these splashes, droplets and streams being contiguous with the side walls of the vessel and depositing molten slag on the side walls.

Preferably the water cooled panels contact the transition zone.

Preferably heat extraction via the water cooled panels is sufficient to build-up and maintain a layer of slag on the water cooled panels that contact the transition zone.

Preferably splashes, droplets and streams of molten material extend above the transition zone and contact the side walls of the vessel above the transition zone.

More preferably heat extraction via the water cooled panels is sufficient to build-up and maintain a layer of slag on the panels that are above the transition zone.

Preferably, the vessel includes a roof that is in contact with the gas continuous space and includes water cooled panels.

Preferably splashes, droplets and streams of molten material extend above the transition zone and contact the roof.

More preferably the heat extraction via the water cooled panels is sufficient to build up and maintain a layer of slag on the panels.

The slag may form as a "wet" layer or a "dry" layer on the water cooled panels. A "wet" layer includes a frozen layer that adheres to the inner surface of the panels, a semi-solid (mush) layer, and an outer liquid film. A "dry" layer is one in which substantially all of the slag is frozen.

Preferably the base and sides of the hearth include a lining of refractory material in contact with the molten bath.

Preferably the refractory lining is formed from refractory bricks.

Preferably the solid material injection lances/tuyeres extend downwardly and inwardly into the vessel at an angle of 30–60°.

Preferably the ends of the solid material injection lances/tuyeres are above the level of the molten metal.

Preferably injection of solid material via the solid material lances/tuyeres causes upward movement of splashes, droplets and streams of molten material into the gas continuous space.

Preferably the one or more than one lance/tuyere which inject the oxygen-containing gas is positioned to inject the oxygen-containing gas into the transition zone to post-combust reaction gases carbon monoxide and hydrogen in the transition zone.

Preferably the tapping means includes a forehearth which enables continuous discharge of molten metal from the vessel.

According to the present invention there is also provided a direct smelting process for producing metals from a metalliferous feed material in the vessel described in the preceding paragraphs, which process includes the steps of:

(a) forming a molten bath having a metal layer and a slag layer on the metal layer;

(b) injecting at least part of the metalliferous feed material and a solid carbonaceous material with a carrier gas into the molten bath via a plurality of lances/tuyeres and smelting the metalliferous material in the metal layer, whereby the solids injection causes gas flow from the metal layer which entrains molten material in the metal layer and carries the molten material upwardly as splashes, droplets and streams and forms a transition zone in a gas continuous space in the vessel above the slag layer, whereby splashes, droplets and streams of molten material contact the side walls of the vessel and form a protective layer of slag;

(c) injecting an oxygen-containing gas into the vessel via one or more than one lance/tuyere and post-combusting reaction gases released from the molten bath whereby ascending and thereafter descending splashes, droplets and streams of molten material facilitate heat transfer to the molten bath; and (d) controlling solid injection and/or oxygen-containing gas injection and/or water flow rate through the water cooled panels so that the heat loss via the water cooled panels is less than 150 kW/m$^2$ of panel area exposed to the inside of the vessel under normal operating conditions.

Preferably the heat loss via the water cooled panels is less than 100 kW/m$^2$ of panel area exposed to the inside of the vessel under normal operating conditions.

More preferably the heat loss via the water cooled panels is less than 90 kW/m$^2$ of panel area exposed to the inside of the vessel under normal operating conditions.

BRIEF DESCRIPTION OF THE DRAWINGS

The present invention is described further by way of example with reference to the accompanying drawings of which:

FIG. 2 is a more detailed view of the left side of the vessel shown in FIG. 1; and FIG. 3 is a front elevation illustrating the arrangement of water cooling pipes of a number of water cooled panels in the cylindrical barrel of the vessel shown in FIGS. 1 and 2.

Figure 1:
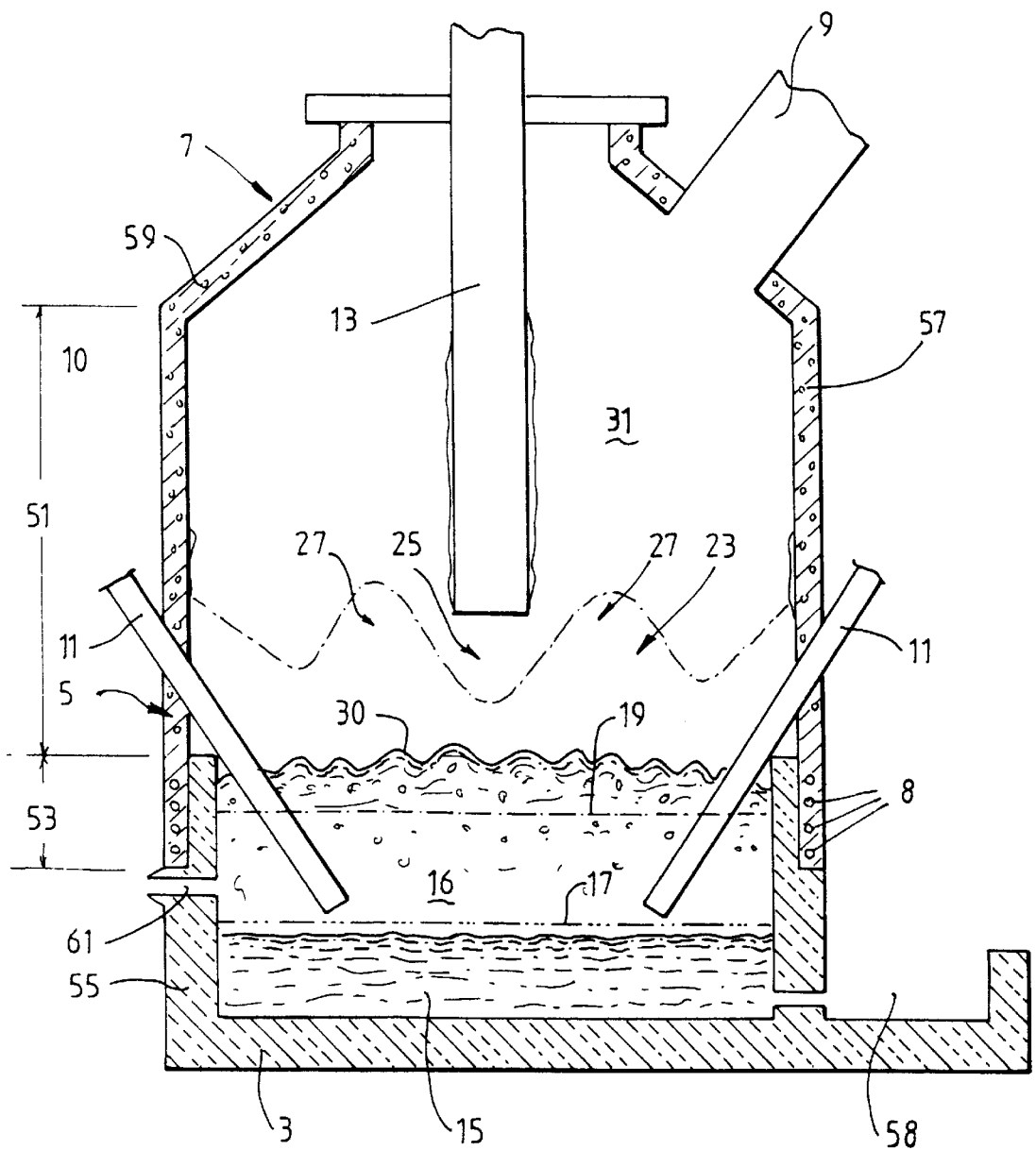
FIG. 1 is a vertical section-through a metallurgical vessel illustrating in schematic form a preferred embodiment of the present invention.

The following description is in the context of direct smelting iron ore to produce molten iron and it is understood that the present invention is not limited to this application and is applicable to any suitable metallic ores and concentrates and other metalliferous feed material—including partially reduced metallic ores and metal containing waste streams.

The vessel shown in the figures has a hearth that includes a base 3 and sides 55 formed from refractory bricks; side walls 5 which form a generally cylindrical barrel extending upwardly from the sides 55 of the hearth and which include an upper barrel section 51 and a lower barrel section 53; a roof 7; an outlet 9 for off-gases; a forehearth 57 for discharging molten metal continuously; and a tap-hole 61 for discharging molten slag periodically.

In use, the vessel contains a molten bath of iron and slag which includes a layer 15 of molten metal and a layer 16 of molten slag on the metal layer 15. The arrow marked by the numeral 17 indicates the position of quiescent surface of the metal layer 15 and the arrow marked by the numeral 19 indicates the position of the quiescent surface of the slag layer 16. The term "quiescent surface" is understood to mean the surface when there is no injection of gas and solids into the vessel.

The vessel also includes 2 solids injection lances/tuyeres 11 extending downwardly and inwardly at an angle of 30°–60° to the vertical through the side walls 5 and into the slag layer 16. The position of the lances/tuyeres 11 is selected so that the lower ends are above the quiescent surface 17 of the metal layer 15.

In use, iron ore (typically fines), solid carbonaceous material (typically coal), and fluxes (typically lime and magnesia) entrained in a carrier gas (typically $N_2$) are injected into the metal layer 15 via the lances/tuyeres 11. The momentum of the solid material/carrier gas causes the solid material and the carrier gas to penetrate the metal layer 15. The coal is devolatilised and thereby produces gas in the metal layer 15. Carbon partially dissolves into the metal and partially remains as solid carbon. The iron ore is smelted to metal and the smelting reaction generates carbon monoxide gas. The gases transported into the metal layer 15 and generated via devolatilisation and smelting produce significant buoyancy uplift of molten metal, solid carbon, and slag (drawn into the metal layer 15 as a consequence of solid/gas/injection) from the metal layer 15 which generates an upward movement of splashes, droplets and streams of molten metal and slag, and these splashes, droplets, and streams entrain slag as they move through the slag layer 16.

The buoyancy uplift of molten metal, solid carbon and slag causes substantial agitation in the metal layer 15 and the slag layer 16, with the result that the slag layer 16 expands in volume and has a surface indicated by the arrow 30. The extent of agitation is such that there is reasonably uniform temperature in the metal and the slag regions—typically, 1450–1550° C. with a temperature variation of not more than 30° C. in each region.

In addition, the upward movement of splashes, droplets and streams of molten material—caused by the buoyancy uplift of molten metal, solid carbon, and slag—extends into the space 31 (the "top space") above the molten bath in the vessel and:

(a) forms a transition zone 23; and (b) projects some molten material (predominantly slag) beyond the transition zone and onto the part of the upper barrel section 51 of the side walls 5 that is above the transition zone 23 and onto the roof 7.

In general terms, the slag layer 16 is a liquid continuous volume, with gas bubbles therein, and the transition zone 23 is a gas continuous volume with splashes, droplets, and streams of molten material (predominantly slag).

The vessel further includes a lance 13 for injecting an oxygen-containing gas (typically pre-heated oxygen enriched air) which is centrally located and extends vertically downwardly into the vessel. The position of the lance 13 and the gas flow rate through the lance 13 are selected so that the oxygen-containing gas penetrates the central region of the transition zone 23 and maintains an essentially metal/slag free space 25 around the end of the lance 13.

The injection of the oxygen-containing gas via the lance 13 post-combusts reaction gases CO and $H_2$ in the transition zone 23 and in the free space 25 around the end of the lance 13 and generates high temperatures of the order of 2000° C. or higher in the gas space. The heat is transferred to the ascending and descending splashes, droplets, and streams of molten material in the region of gas injection and the heat is then partially transferred to the metal layer 15 when the metal/slag returns to the metal layer 15.

The free space 25 is important to achieving high levels of post combustion because it enables entrainment of gases in the top space above the transition zone 23 into the end region of the lance 13 and thereby increases exposure of available reaction gases to post combustion.

The combined effect of the position of the lance 13, gas flow rate through the lance 13, and upward movement of splashes, droplets and streams of molten material is to shape the transition zone 23 around the lower region of the lance 13—generally identified by the numerals 27. This shaped region provides a partial barrier to heat transfer by radiation to the side walls 5.

Moreover, the ascending and descending droplets, splashes and streams of molten material is an effective means of transferring heat from the transition zone 23 to the molten bath with the result that the temperature of the transition zone 23 in the region of the side walls 5 is of the order of 1450° C.–1550° C.

In accordance with a preferred embodiment of the present invention the vessel is constructed with reference to the levels of the metal layer 15, the slag layer 16, and the transition zone 23 in the vessel when the process is operating under normal operating conditions and with reference to splashes, droplets and streams of molten material (predominantly slag) that are projected into the top space 31 above the transition zone 23 when the process is operating, so that:

(a) the hearth and the lower barrel section 53 of the side walls 5 that contact the metal/slag layers 15/16 are formed from bricks of refractory material (indicated by the cross-hatching in the figure) which contact directly the metal and slag in these layers;

(b) at least part of the lower barrel section 53 of the side walls 5 is backed by water cooled panels 8; and (c) the part of the upper barrel section 51 of the side walls 5 that contact the transition zone 23, the remainder of the upper barrel section 51 that is above the transition zone 23, and the roof 7 are formed from water cooled panels 57, 59.

Each water cooled panel 8, 57, 59 (not shown) in the upper barrel section 51 of the side walls 5 has parallel upper and lower edges and parallel side edges and is curved so as to define a section of the cylindrical barrel. As can best be seen in FIGS. 2 and 3, each panel 57,59 includes an inner water cooling pipe 63 and an outer water cooling pipe 65. The pipes 63,65 are formed into a serpentine configuration with parallel horizontal sections interconnected by curved sections. The pipes 63,65 further include water inlets/water outlets 69. The pipes 63,65 are displaced vertically so that the horizontal sections of the outer pipe 65 are not immediately behind the horizontal sections of the inner pipe 63 when viewed from an exposed face of the panel, ie the face that is exposed to the interior of the vessel. Each panel 63,65 further includes a rammed or gunned refractory material which fills the spaces between the adjacent horizontal sections of each pipe 63,65 and between the pipes 63,65 and forms an inner face of the panel. Each panel further includes a support plate 67 which forms an outer surface of the panel.

The water inlets/water outlets 69 of the pipes are connected to a water supply circuit (not shown) which circulates water at high flow rate through the pipes.

In use, the water flow rate through the water cooled panels 57, 59, the solids/carrier gas flow rate via the lances/tuyeres 11, and the oxygen-containing gas flow rate via the lance 13 are controlled so that there is sufficient slag contacting the panels and sufficient heat extraction from the panels to build-up and maintain a layer of frozen slag on the panels. The slag layer forms an effective thermal barrier which thereafter minimises heat loss to below 150 kW/m² from the side walls 5 and the roof 7 of the vessel under normal operating conditions of the process.

In extensive pilot plant work carried out by the applicant the applicant has recorded significantly lower heat losses than have been reported with other vessels.

The pilot plant work referred to above was carried out as a series of extended campaigns by the applicant at its pilot plant at Kwinana, Western Australia.

The pilot plant work was carried out with the vessel shown in the figure and described above and in accordance with the process conditions described above.

The pilot plant work evaluated the vessel and investigated the process under a wide range of different:

(a) feed materials;

(b) solids and gas injection rates;

(c) slag:metal ratios;

(d) operating temperatures; and (e) apparatus set-ups.

Table 1 below sets out relevant data during typical start-up and stable operating conditions of the pilot plant work.

|  |  | START UP | STABLE OPERATION |
|---|---|---|---|
| Bath Temperature | (° C.) | 1450 | 1450 |
| Operating Pressure | (bar g) | 0.5 | 0.5 |
| HAB Air | (kNm³/h) | 26.0 | 26.0 |
| Oxygen in HAB | (%) | 20.5 | 20.5 |
| HAB Temperature | (C.) | 1200 | 1200 |
| DSO Ore | (t/h) | 5.9 | 9.7 |
| Coal | (t/h) | 5.4 | 6.1 |
| Calcined Flux | (t/h) | 1.0 | 1.4 |
| Ore Feed Temp | (C.) | 25.0 | 25.0 |

-continued

|  |  | START UP | STABLE OPERATION |
|---|---|---|---|
| Hot Metal | (t/h) | 3.7 | 6.1 |
| Slag | (t/h) | 2.0 | 2.7 |
| Post Combustion | (%) | 60.0 | 60.0 |
| Offgas Temperature | (C.) | 1450 | 1450 |
| Heat Transfer to Bath | (MW) | 11.8 | 17.3 |
| Heat Loss to Panels | (MW) | 12.0 | 8.0 |
| Coal Rate | (kg/thm) | 1453 | 1003 |

The iron ore was a normal fine direct shipping ore and contained 64.6% iron, 4.21% $SiO_2$, and 2.78% $Al_2O_3$ on a dry basis.

An anthracite coal was used both as a reductant and a source of carbon and hydrogen to combust and supply energy to the process. The coal had a calorific value of 30.7 MJ/kg, an ash content of 10%, and a volatile level of 9.5%. Other characteristics included 79.82% total carbon, 1.8% $H_2O$, 1.59% $N_2$, 3.09% $O_2$, and 3.09% $H_2$.

The process was operated to maintain a slag basicity of 1.3 ($CaO/SiO_2$ ratio) using a combination of fluxes of lime and magnesia. The magnesia contributed MgO thereby reducing the corrosiveness of the slag to the refractory by maintaining appropriate levels of MgO in the slag.

Under start-up conditions the pilot plant operated with: a hot air blast rate of 26,000 $Nm^3$/h at 1200° C.; a post combustion rate of 60% $((CO_2+H_2O)/(CO+H_2+CO_2+H_2O))$; and a feed rate of iron ore fines of 5.9 t/h, a feed rate of coal of 5.4 t/h and a feed rate of flux of 1.0 t/h, all injected as solids using $N_2$ as a carrier gas. There was little or no slag in the vessel and there was not sufficient opportunity to form a frozen slag layer on the side panels. As a consequence, the cooling water heat loss was relatively high at 12 MW. The pilot plant operated at a production rate of 3.7 t/h of hot metal (4.5 wt % C.) and a coal rate of 1450 kg coal/t hot metal produced.

Under stable operating conditions, with control of slag inventory and a frozen slag layer on the water cooling panels forming the side walls 5 and the roof 7, relatively low total water cooling heat losses of 8 MW were recorded. It is noted that this total water cooling heat loss is the sum of water cooling heat losses from the water cooled panels of the side walls 5 and the roof 7 and also from other water cooled components of the vessel, such as the lances/tuyeres 11 and the lance 13. This total water cooling heat loss equates to less than 150 $kW/m^2$ of exposed panel surface of the side walls 5 and the roof 7. The reduction of the heat lost to the water cooling system allowed an increased productivity to 6.1 t/h of hot metal. The increased productivity was obtained at the same hot air blast rate and post combustion as at start-up. Solid injection rates were 9.7 t/h of ore fines and 6.1 t/h of coal along with 1.4 t/h of flux. The improved productivity also improved the coal rate to 1000 kg coal/t hot metal achieved.

The initial design of the water cooling panels for the side walls 5 and the roof 7 of the pilot plant vessel were based on experience from EAF and EOF furnace operation. The design heat flux figures were:

| Roof: | 230 $kW/m^2$ |
|---|---|
| Upper barrel: | 230 $kW/m^2$ |
| Lower barrel: | 290 $kW/m^2$ |

The cooling water circuits were designed with a maximum flow rate to achieve a heat flux of 350 $kW/m^2$.

It was expected prior to commencing pilot plant trials that the water cooling panels that were exposed directly to the interior of the vessel—ie that were not brick lined—would have heat losses of around 250 $kW/m^2$. However, under stable operating conditions the heat losses were unexpectedly low—as low as 85 and 65 $kW/m^2$—particularly on the exposed water cooling panels forming the upper barrel 51 above the transition zone 23 and the roof 7. In the early campaigns where there was minimal wear of the rammed or gunned refractory material of the panels, the heat losses ranged from and averaged:

| Roof: | 80–170 | 120 $kW/m^2$ |
|---|---|---|
| Upper Barrel: | 60–165 | 95 $kW/m^2$ |
| Lower Barrel: | 40–160 | 70 $kW/m^2$ |

The panels in the lower barrel 53 were partly protected by refractory bricks.

A similar set of data was obtained from a later campaign. The following data from this campaign reflects the impact of increased wear of the rammed or gunned refractory material of the water cooling panels:

| Roof: | 80–245 | 145 $kW/m^2$ |
|---|---|---|
| Upper Barrel: | 75–180 | 130 $kW/m^2$ |
| Lower Barrel: | 50–170 | 110 $kW/m^2$ |

Many modifications may be made to the preferred embodiment of the vessel described above without departing from the spirit and scope of the present invention.

What is claimed is:

1. A vessel which produces metal from a metalliferous feed material by a direct smelting process, which vessel contains a molten bath having a metal layer and a slag layer on the metal layer and has a gas continuous space above the slag layer, which vessel includes:
   (a) a hearth formed of refractory material having a base and sides in contact with the molten metal;
   (b) side walls which extend upwardly from the sides of the hearth and are in contact with the slag layer and the gas continuous space, wherein the side walls that contact the gas continuous space include water cooled panels and a layer of slag on the panels and the heat loss via the water cooled panels is less than 150 $kW/m^2$ of panel area exposed to the inside of the vessel under normal operating conditions;
   (c) a roof that is in contact with the gas continuous space, wherein the roof includes water-cooled panels and a layer of slag on the panels, and the heat loss via the water-cooled panels of said roof is less than 150 $kW/m^2$ of panel area exposed to the inside of the vessel under normal operating conditions;
   (d) one or more than one lance/tuyere extending downwardly into the vessel and injecting an oxygen-containing gas into the vessel above the metal layer;
   (e) a plurality of lances/tuyeres injecting at least part of the metalliferous feed material and a carbonaceous material with a carrier gas into the molten bath so as to penetrate the molten bath; and (f) a means for tapping molten metal and slag from the vessel.

2. The vessel defined in claim 1 wherein each water cooled panel includes an inner water cooling pipe that has a serpentine shape, a water inlet at one end, and a water outlet at the other end.

3. The vessel defined in claim 2 wherein each water cooled panel further includes an outer water cooling pipe that has a serpentine shape, a water inlet at one end, and a water outlet at the other end.

4. The vessel defined in claim 3 wherein each water cooled panel further includes a refractory material rammed or gunned in the spaces of the panel that are not occupied by the pipes.

5. The vessel defined in claim 3 wherein each of the inner and the outer water cooling pipes includes parallel, horizontal sections that extend across the width of the panel and curved sections that interconnect the ends of the horizontal sections.

6. The vessel defined in claim 5 wherein the outer water cooling pipe is displaced from the inner water cooling pipe so that the horizontal sections of the outer water cooling pipe are not immediately behind the horizontal sections of the inner water cooling pipe.

7. The vessel defined in claim 1 wherein an inner exposed surface of each water cooling panel includes a surface finish that increases the exposed surface area of the panel and promotes attachment of frozen slag onto the surface.

8. The vessel defined in claim 1 wherein each water cooling panel includes members which project inwardly from an inner exposed face of the panel and promote formation and growth of frozen slag on the panel.

9. The vessel defined in claim 1 wherein at least a section of the side walls that contact the slag layet include water cooled panels, a lining of refractory material positioned inwardly of the panels, and a layer of slag on the lining.

10. The vessel defined in claim 1 contains a transition zone formed by ascending and thereafter descending splashes, droplets and streams of molten material in the gas continuous space above the slag layer with some of these splashes, droplets and streams being contiguous with the side walls of the vessel and deposit molten slag on the side walls.

11. The vessel defined in claim 10 wherein the side walls include water cooled panels that contact the transition zone.

12. The vessel defined in claim 11 wherein heat extraction via the water cooled panels is sufficient to build-up and maintain a layer of slag on the water cooled panels that contact the transition zone.

13. The vessel defined in claim 10 wherein the side walls include water cooled panels that are above the transition zone.

14. The vessel defined in claim 13 wherein heat extraction via the water cooled panels is sufficient to build-up and maintain a layer of slag on the panels that are above the transition zone.

15. The vessel defined in claim 1 wherein the solid material injection lances/tuyeres extend downwardly and inwardly into the vessel at an angle of 30–60° to the vertical.

16. The vessel defined in claim 1 wherein lower ends of the solid material injection lances/tuyeres are above the level of the molten metal.

17. The vessel defined in claim 10 wherein injection of solid material via the solid material injection lances/tuyeres causes upward movement of splashes, droplets and streams of molten material into the gas continuous space.

18. The vessel defined in claim 10 wherein the one or more than one lance/tuyere which inject the oxygen-containing gas is positioned to inject the oxygen-containing gas into the transition zone to post-combust reaction gases carbon monoxide and hydrogen in the transition zone.

19. The vessel defined in claim 10 wherein the tapping means includes a forehearth which enables continuous discharge of molten metal from the vessel.

20. A direct smelting process for producing metals from metalliferous feed material in the vessel defined in claim 1, which process includes the steps of:

(a) forming a molten bath having a metal layer and a slag layer on the metal layer;

(b) injecting at least part of the metalliferous feed material and a solid carbonaceous material with a carrier gas into the molten bath via a plurality of lances/tuyeres and smelting the metalliferous material in the molten bath, whereby the solids injection causes gas flow which entrains molten material in the molten bath and carries the molten material upwardly as splashes, droplets and streams and forms a transition zone in a gas continuous space in the vessel above the slag layer, whereby splashes, droplets and streams of molten material contact the side walls and the roof of the vessel and form a protective layer of slag;

(c) injecting an oxygen-containing gas into the vessel via one or more than one lance/tuyere and post-combusting reaction gases released from the molten bath whereby ascending and thereafter descending splashes, droplets and streams of molten material facilitate heat transfer to the molten bath; and (d) controlling solids injection and/or oxygen-containing gas injection and/or water flow rate through the water cooled panels so that there is sufficient slag contacting the panels and sufficient heat extraction from the panels to build up and maintain the protective layer of the slag such that the heat loss via the water cooled panels in the side walls and the roof is less than 150 kW/m$^2$ of panel area exposed to the inside of the vessel under normal operating conditions.

21. The process defined in claim 20 wherein the heat loss via the water cooled panels is less than 100 kW/m$^2$ of panel area exposed to the inside of the vessel under normal operating conditions.

22. The process defined in claim 21 wherein the heat loss via the water cooled panels is less than 90 kW/m$^2$ of panel area exposed to the inside of the vessel under normal operating conditions.

23. The vessel defined in claim 7 wherein the surface finish comprises a ripple or a waffle surface.

24. The vessel defined in claim 8 wherein the members comprise pins or cups.

* * * * *